United States Patent
Politycki et al.

[15] 3,659,098
[45] Apr. 25, 1972

[54] ARRANGEMENT FOR FACILITATING ADJUSTMENT OF THE ELECTRONIC BEAM OF AN ELECTRONIC-BEAM MICROANALYZER AND METHOD OF PRODUCING SAME

[72] Inventors: Alfred Politycki, Ottobrunn; Ulrich Jecht, Karlsruhe; Jurgen Gullasch, Kandel-Minderslachen, all of Germany

[73] Assignee: Siemens Aktiengesellschaft, Munich, Germany

[22] Filed: June 16, 1970

[21] Appl. No.: 46,763

[30] Foreign Application Priority Data

June 28, 1969 Germany......................P 19 32 926.1

[52] U.S. Cl..........................250/49.5 A, 96/36, 250/49.5 C, 313/348
[51] Int. Cl.........................................................H01j 37/26
[58] Field of Search...................250/49.5 A, 49.5 C, 49.5 D, 250/49.5 PE; 313/348; 350/162 ZP; 29/25.17; 96/36; 204/11, 143; 156/8, 16

[56] References Cited

UNITED STATES PATENTS

| | | | |
|---|---|---|---|
| 2,661,029 | 12/1953 | Walsh | 313/348 X |
| 3,130,487 | 4/1964 | Mears | 313/348 X |
| 2,858,463 | 10/1958 | Koda et al. | 313/348 X |
| 3,192,136 | 6/1965 | Reid | 96/36 X |
| 3,545,854 | 12/1970 | Olsson | 350/162 ZP |

OTHER PUBLICATIONS

Hillier; Journal of Applied Physics; Vol. 17, No. 6; pp. 411–419; June 1946

Primary Examiner—James W. Lawrence
Assistant Examiner—C. E. Church
Attorney—Edwin E. Greigg

[57] ABSTRACT

A fine-meshed metallic grating to aid in adjusting the beam of an electronic-beam microanalyzer, particularly for contrast adjustment, comprising a central grating structure having at the edges of the ribs and junctions thereof one or more layers of metals coplanar with the central structure and having different atomic numbers from the metal thereof. The layers are deposited electrolytically with the central structure placed on a non-conductive base.

6 Claims, 4 Drawing Figures

PATENTED APR 25 1972 3,659,098

ARRANGEMENT FOR FACILITATING ADJUSTMENT OF THE ELECTRONIC BEAM OF AN ELECTRONIC-BEAM MICROANALYZER AND METHOD OF PRODUCING SAME

BACKGROUND OF THE INVENTION

The invention relates to the adjusting of the beam of an electronic-beam microanalyzer, in particular to a grating structure for facilitating the adjusting of the contrast in connection with micro-probe investigations.

The invention above relates to a method of producing a fine-meshed metallic grating structure for use in testing electronic-beam microanalyzers.

PRIOR ART

It is previously known from the Published German Pat. No. 1,913,134 to use a metallic grating structure to compensate for the astigmatism of an electronic lens, the grating having a high degree of edge sharpness and serving as a test object. The electronic beam of the microanalyzer was then scanned over the bars of the grating structure in a linear path with the aid of the electronic line-scanning device of the microanalyzer, the direction of the linear scan being adjustable in such a way as to cover a plurality of the bars of the metallic grating structure, which preferably form an angle of about 45°. The grating is place in the object plane of the microanalyzer.

SUMMARY OF THE INVENTION

The grating structure according to the invention is particularly suitable for contrast adjustments in connection with microscopic investigations and is characterized by the essential features of a central grating structure of metal forming bars and junctions thereof. On the edges of the bars and junctions there are provided in the same plane as that of the central grating structure one or more additional metallic layers, the atomic numbers of the metals of which are different from that of the central grating, and which are disposed laterally of each other. The same grating can also be used for compensation of astigmatism and for determining the amount of magnification.

The method according to the invention for producing a grating structure of the kind referred to comprises the steps of depositing on a non-conductive base, such as a glass plate or a plastic foil, a thin metallic layer, depositing on the layer a coating of photosensitive material, such as varnish, projecting optically the grating structure on the coated metallic layer with the aid of a photographic original representing the structure, chemically developing the exposed portions of the photosensitive coating so as to remove the same, transforming the uncovered portions of metallic layer by means of etching with vaporized iodine into a metallic iodine compound, which is then washed off by means of a fixing agent, the portions of photosensitive coating remaining on the bars and junctions forming the central grating structure being removed with solvents known per se, and depositing electrolytically one or more additional metallic layers in superposition on the bars and junctions of the central grating.

DESCRIPTION OF EMBODIMENT

Figure 1:
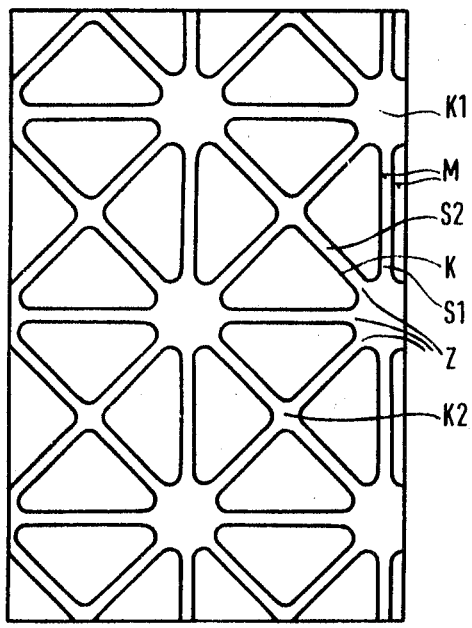
FIG. 1 is a plan view of a portion of the grating structure.

In FIG. 1 there is shown a portion of a grating structure K comprising a plurality of bars, such as bar S 1, and junctions K 1 and K 2. The junctions K 1, from which eight bars issue radially, are at the corners of squares composed of 4 bars and the junctions K 2 are at the intersections of bars forming the diagonals of the squares.

The grating K comprises a central grating structure Z, on the edges of the bars and junctions of which at least one additional layer of a metal M (represented by black lines as shown at bar S 1) has been deposited. The metal of the central structure Z may be silver or copper and should have an atomic number which differs from that of the layer M, which may be nickel or gold.

An entire grating K comprises a circle of an approximate diameter of 3.8 mm. with the widths of the smaller meshes being about 50 microns. The width of the bars should be less than 10 microns and the thickness thereof is on the order of 2 – 4 microns.

Figure 2:
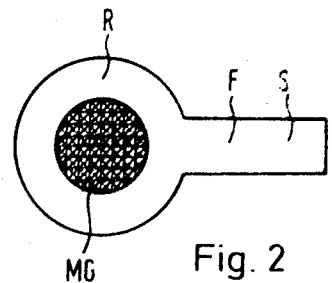
FIG. 2 shows a drawn original to be used for projection.

The production of gratings of the type shown takes place with the aid of a photographic original F presenting a geometrical configuration which corresponds exactly to the central bars of the grating K. First, there is produced a highly magnified drawing of the configuration, which must be done with the utmost degree of precision in regard to the width of the meshes. The master structure MG is surrounded by a broad annular band or ring R with a straight tape-like section S attached thereto, as shown in FIG. 2.

Figure 3:
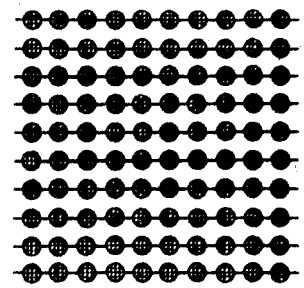
FIG. 3 shows the result of multiple diminished reproduction of the FIG. 3 drawing.

The master drawing produced in this manner is blown down photographically several times so as to make the outer diameter of the ring R, which corresponds to the dimension of the sensitive element of the microprobe, until the diameter is about 3.8 mm. and the width of the bars approximately 2 – 4 microns. With the aid of a repeater, which is well known in the art, this pattern is transferred to a photographic plate in multiplied form so as to form a plurality of rows of grating discs connected together by the linear sections, as shown in FIG. 3.

This photographic plate with the black bars and transparent spaces therebetween forms the original used for the photographic layer process to be described below.

Figure 4:
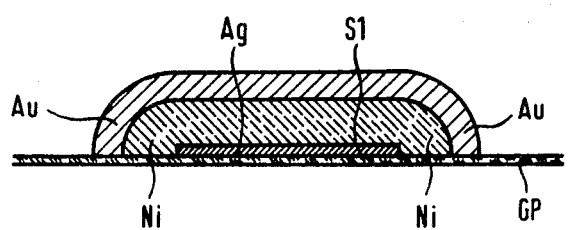
FIG. 4 illustrates the arrangement for electro-lytical deposition.

The method of producing the grating K will be explained in more detail with reference to FIG. 4. First, a base of nonconductive material, such as a glass plate or a Mylar foil tensioned on a frame, is silvered by chemical means and coated with a thin film of photosensitive varnish. This may be done by means of well-known spraying techniques. Care should be taken to avoid contamination by dust particles or the like, such as by performing the work under a laminar box or in a dustproof room, so that no particles can become attached to the photosensitive layer. After this, the photolayer is exposed to ultra-violet radiation, which may be obtained from a high pressure mercury lamp serving as an approximately point-shaped light source. The ultra-violet light is paralleled with the aid of a parabolic mirror in well-known manner and directed onto the photographic original. During the exposition, the Mylar foil can be sucked against the photographic original with the aid of a vacuum. In this manner, it is possible to reproduce the fine-meshed grating K 1 according to FIG. 1 on the silver layer of the base.

After the process referred to, the Mylar foil or base with the exposed photosensitive layer is developed. In the developing process, the exposed portions of the photosensitive layer are removed and there remains a grating configuration of photosensitive layer.

The portion of the silver coating which is not covered by the photolayer is removed by exposing the plate to vaporize iodine. This iodine transforms the uncovered silver layer together with the silver layer on the rear side of the base plate, into silver iodide. The silver iodide can be dissolved in known manner with the aid of a fixing bath so that there remains on the base the grating in the form of a relief made up of the silver and photosensitive layers. Known chemical means are then used to remove the photolayer from the silver rods. One of the silver rods, designated S 1, is shown in cross section in FIG. 4 lying on the base plate, i.e. a glass plate GP. The entire grating structure on the plate GP is then provided with at least an additional electrolytically deposited metal coating so as to obtain a sufficient degree of stability and to produce at least one further metallic layer juxtaposed to the bar and having an atomic number which differs from that of the bar metal. Preferably, a pair of metals are deposited, having atomic numbers which differ by at least two units from each other. The electrolytic solution used must be thoroughly filtered and it is preferable to provide stirring of the bath. In the process of electrolysis, there is deposited on the bars of the grating structure, only one of which is shown in FIG. 4 and designated S 1, a metallic coating Ni, such as of nickel, which covers the bar S 1 laterally as well as on the rear surface thereof, resulting in a broadening of the bar S 1 at its edges. The thickness of the deposited coating Ni depends on the duration of the electrolysis and the amperage. It is also possible, as shown in FIG. 4, to deposit a second metallic coating Au, which may be of gold, on top of the nickel coating Ni.

After the electrolytic process, the batch of attached gratings are pulled off from the glass plate. If a Mylar foil is used as a base instead of a glass plate, it is also possible to use some known method of chemically dissolving the foil, for instance trichloracetic acid and dichlormethane in the proportion 1 to 5. After the removal of the base GP, the grating K has an even surface on the side that was facing the base. This last-named surface is the front surface of the grating and is the visible side of the structure shown in FIG. 1. As it may be best observed from the cross-sectional representation of one grate element in FIG. 4, the planar front surface of the grate is formed of the front surface of the central structure Z and the front or edge surface of a border structure.

What is claimed is:

1. A method of producing a fine-meshed metallic grating for testing electronic-beam microanalyzers, comprising the steps of:
   coating a base plate of non-conductive material with a thin metallic layer and depositing on said layer a photosensitive material,
   producing a photographic original of the grating structure and projecting the same optically on the photosensitive-coated metallic layer and removing the portions corresponding to the grating structure by means of chemical development of the exposed portions of the photosensitive layer,
   transforming the uncovered portions of the metallic layer by means of etching with vaporized iodine into a metal-iodine-composition and removing the same with the aid of a fixing agent,
   removing the remaining portions of the photosensitive layer with the aid of a solvent so as to form a central grating structure composed of ribs and junctions thereof,
   depositing electrolytically on the ribs and junctions of the central grating structure at least one additional metallic layer so as to entirely cover each said rib and junction and to contact said base plate in a narrow area along the outline of each rib and junction and
   removing said base plate from said grating formed of said central grating structure and said at least one additional metallic layer.

2. A method as claimed in claim 1, in which the grating structure is pulled off by mechanical force from the supporting base.

3. A method as claimed in claim 1, in which a plurality of gratings are produced simultaneously in the form of a batch of linearly interconnected grating structures.

4. A fine-meshed metallic grating for use in adjusting the electronic beam of a microanalyzer and for facilitating adjustment of the contrast in microprobe investigations, comprising
   A. a central grating structure made of a first metal and composed of ribs and junctions thereof, said ribs and junctions having a front surface contained in a single plane and
   B. a border structure made of at least one second metal and being integral with said central grating structure, said border structure extending laterally along the outline of each said rib and each said junction, said border structure having a front surface adjacent to and coplanar with the front surface of said ribs and junctions, said first metal having an atomic number differing from that of said second metal.

5. A grating as claimed in claim 4, wherein said ribs and junctions have a rear surface, said border structure is formed of at least one metal layer extending over said rear surface and terminating adjacent each rib and each junction.

6. A grating as claimed in claim 4, wherein said first metal is selected from the group consisting of silver and copper, said second metal is selected from the group consisting of nickel and gold.

* * * * *